(12) United States Patent
Haldenby et al.

(10) Patent No.: US 11,604,899 B2
(45) Date of Patent: Mar. 14, 2023

(54) DYNAMIC USER INTERFACE FOR DATA EXCHANGE SPLIT

(71) Applicant: The Toronto-Dominion Bank, Toronto (CA)

(72) Inventors: Perry Aaron Jones Haldenby, Toronto (CA); Arthur Carroll Chow, Markham (CA); Anthony Haituyen Nguyen, Toronto (CA); Het Anand Patel, Mississauga (CA); Casey Lyn Doyle, Ajax (CA); Yubing Liu, Toronto (CA); John Jong-Suk Lee, Toronto (CA)

(73) Assignee: The Toronto-Dominion Bank

( * ) Notice: Subject to any disclaimer, the term of this patent is extended or adjusted under 35 U.S.C. 154(b) by 90 days.

(21) Appl. No.: 16/900,447

(22) Filed: Jun. 12, 2020

(65) Prior Publication Data

US 2020/0311292 A1   Oct. 1, 2020

Related U.S. Application Data

(63) Continuation of application No. 15/720,651, filed on Sep. 29, 2017, now Pat. No. 10,846,435.

(Continued)

(51) Int. Cl.
*G06F 21/62* (2013.01)
*G06F 16/23* (2019.01)
(Continued)

(52) U.S. Cl.
CPC .......... *G06F 21/629* (2013.01); *G06F 3/0482* (2013.01); *G06F 3/0484* (2013.01); *G06F 3/0488* (2013.01); *G06F 3/14* (2013.01); *G06F 11/3006* (2013.01); *G06F 11/3089* (2013.01); *G06F 16/23* (2019.01);
(Continued)

(58) Field of Classification Search
None
See application file for complete search history.

(56) References Cited

U.S. PATENT DOCUMENTS

2002/0138386 A1   9/2002   Maggioncalda et al.
2010/0169237 A1   7/2010   Howard et al.
(Continued)

FOREIGN PATENT DOCUMENTS

EP   2776996   9/2014

*Primary Examiner* — Dawaune A Conyers
(74) *Attorney, Agent, or Firm* — Fish & Richardson P.C.

(57) ABSTRACT

The present disclosure involves systems, software, and computer implemented methods for providing user interface (UI)-based modifications to adjust and interact with data exchange splits. An example client device can include can identify a data exchange (DE) associated with at least three entities, the DE associated with a total value. A visualization representing the DE can be presented via a UI and can include a chart comprising the total value of the DE exchange divided into value areas that are each associated with a particular entity. In response to a detection of input associated with a selection of an edge between a first and second value area, the combined value area associated with the first and second value areas can be locked. In response to detected movement input associated with the edge, the relative values of the first and second inside the combined value area can be adjusted in the visualization.

20 Claims, 9 Drawing Sheets

Related U.S. Application Data

(60) Provisional application No. 62/402,529, filed on Sep. 30, 2016.

(51) Int. Cl.
| | |
|---|---|
| G06F 16/93 | (2019.01) |
| G06F 16/435 | (2019.01) |
| G06F 16/2458 | (2019.01) |
| G06F 16/2455 | (2019.01) |
| G06Q 20/00 | (2012.01) |
| H04W 12/08 | (2021.01) |
| H04W 12/086 | (2021.01) |
| H04L 67/50 | (2022.01) |
| G06F 3/0482 | (2013.01) |
| G06F 21/53 | (2013.01) |
| G06Q 30/04 | (2012.01) |
| G06Q 20/38 | (2012.01) |
| H04W 12/06 | (2021.01) |
| G06Q 20/10 | (2012.01) |
| G06Q 20/14 | (2012.01) |
| G06Q 10/0631 | (2023.01) |
| G06Q 10/087 | (2023.01) |
| G06Q 10/105 | (2023.01) |
| G06Q 10/1093 | (2023.01) |
| G06F 3/0484 | (2022.01) |
| G06F 3/0488 | (2022.01) |
| G06F 3/14 | (2006.01) |
| H04L 67/1097 | (2022.01) |
| G06F 11/30 | (2006.01) |
| G06Q 20/40 | (2012.01) |
| G06Q 50/22 | (2018.01) |

(52) U.S. Cl.
CPC .... *G06F 16/2462* (2019.01); *G06F 16/24554* (2019.01); *G06F 16/435* (2019.01); *G06F 16/93* (2019.01); *G06F 21/53* (2013.01); *G06Q 10/06316* (2013.01); *G06Q 10/087* (2013.01); *G06Q 10/105* (2013.01); *G06Q 10/1097* (2013.01); *G06Q 20/00* (2013.01); *G06Q 20/102* (2013.01); *G06Q 20/14* (2013.01); *G06Q 20/38* (2013.01); *G06Q 30/04* (2013.01); *H04L 67/1097* (2013.01); *H04L 67/535* (2022.05); *H04W 12/06* (2013.01); *H04W 12/08* (2013.01); *H04W 12/086* (2021.01); *G06Q 20/4016* (2013.01); *G06Q 50/22* (2013.01)

(56) References Cited

U.S. PATENT DOCUMENTS

| | | |
|---|---|---|
| 2015/0073959 A1 | 3/2015 | Connors et al. |
| 2015/0095265 A1* | 4/2015 | Feinendegen ......... G06Q 40/06 705/36 R |
| 2015/0206245 A1 | 7/2015 | Basu et al. |
| 2016/0117651 A1* | 4/2016 | Davis ................ G06Q 20/3255 705/40 |
| 2017/0193468 A1* | 7/2017 | Chougule ........... G06Q 20/223 |
| 2018/0096036 A1 | 4/2018 | Haldenby et al. |

* cited by examiner

DYNAMIC USER INTERFACE FOR DATA EXCHANGE SPLIT

CROSS-REFERENCE TO RELATED APPLICATIONS

This application is a continuation of and claims the benefit of priority to U.S. patent application Ser. No. 15/720,651, filed Sep. 29, 2017, which claims the benefit of priority to U.S. Provisional Application Ser. No. 62/402,529, filed on Sep. 30, 2016, the contents of which are hereby incorporated by reference.

TECHNICAL FIELD

The present disclosure relates to computer-implemented methods, software, and systems for providing user interface (UI)-based modifications to adjust and interact with data exchange splits. The present disclosure also relates to computer-implemented methods, software, and systems for analyzing a current data exchange to identify one or more historical data exchanges having similar parameters, and associating or suggesting one or more proposed parameters to be applied to the current data exchange based on the analysis.

BACKGROUND

Current methods of splitting data exchanges associated with a total value among a plurality of persons require manual input of values, and may require two hands for fast input. In splitting total tasks, responsibilities, bills, and other total or subvalues associated with a particular event or action, significant user interactions may be required.

Various data exchanges, such as the payment of one or more bills, represents a crucial financial action customers must make on a periodic or regular basis. In many cases, such as sharing arrangements (e.g., roommates, co-workers, partnerships, etc.), two or more entities (e.g., persons, customers) may be associated with a single data exchange (e.g., a bill or other payment request). However, in many of those cases, the single data exchange may be initially associated with only a single entity or person, or with a particular account specific to that single entity or person. Where the data exchange request is associated with goods or services shared by the multiple entities, a data exchange split mechanism may be used to provide the original payee with the ability to split the bill with one or more other persons or entities. Example situations where the need for such splits may include bills related to shared dwellings, office sharing arrangements, rental properties and costs shared between individual renters themselves and with owners, split funding of a shared activity among friends and acquaintances, splitting of phone and data plans among friends or family, and other suitable examples.

The current solutions related to splitting responsibility for such data exchanges involves manual inputs applied individually to each separate data exchange.

SUMMARY

The present disclosure involves systems, software, and computer implemented methods for performing data exchange splitting. One example client device includes a user interface, a communications module, at least one input device, at least one memory storing instructions, and at least one hardware processor interoperably coupled with the at least one memory, the at least one input device, and the communications module, wherein the instructions instruct the at least one hardware processor to perform operations. In one instance, those operations include identifying a data exchange associated with at least three entities, the data exchange associated with a total value. An interactive visualization representing the identified data exchange can be presented via the user interface, where the interactive visualization includes a chart comprising the total value of the data exchange, where the total value is divided into a plurality of value areas for each of the entities. Each of the plurality of value areas are associated with a value representing a portion of the total value, and an interior of each value area is associated with a first selectable control while edges connecting pairs of the value areas are each associated with a second selectable control. The sum of the values associated with each of the value areas represents the total value of the data exchange. An input associated with a selection of a particular edge can be detected via at least one input device, where the particular edge connects a first and second value area. In response to the selection of the particular edge, each value area not connected to the particular edge can be locked at a current value associated with each value area. The combined value area associated with the first and second values areas can also be locked, where the combined value area represents a combination of the value associated with the first value area and the value associated with the second value area at time of the detected selection of the particular edge. A movement input associated with a movement of the particular edge can be detected via at least one input device. In response to detecting the movement input, a split of the combined value area associated with the first and second value areas can be adjusted in the presented interactive visualization, where adjusting the split includes modifying a value associated with each of the first and second value areas in response to the detected movement input.

Implementations can optionally include one or more of the following features.

In some instances, the client device comprises a mobile device. In those instances, the at least one input device can comprise a touchscreen capable of accepting touch-based inputs, where the detected inputs represent touch-based inputs. In some instances, the detected movement input is detected while the detected input associated with the selection of the particular edge is maintained.

In some instances, presenting the interactive visualization further comprises presenting an interactive slider presented adjacent to the interactive visualization of the chart, the interactive slider providing a plurality of sliders, each slider corresponding to one of the plurality of value areas. In those instances, in response to adjusting the split of the combined value area associated with the first and second value areas in the presented interactive visualization, sliders associated with the first and second value areas are updated to the modified values associated with first and second value areas.

In some instances, adjusting a split of the combined value area associated with the first and second value areas in the presented interactive visualization comprises maintaining the prior values associated with each of the locked values areas.

In some instances, after modifying the value associated with each of the first and second value areas in response to the detected movement input, the combined value of the modified values of the first and second value areas matches the combined value of first value area and the second value areas at the time of the detected selection of the particular edge.

In some instances, the instructions instruct the at least one hardware processor to detect an end of the input associated with the selection of the particular edge, and, in response to detecting the end of the input associated with the selection of the particular edge, unlock each value area not connected to the particular edge and unlock the combined value area associated with the first and second value areas.

In some instances, the detected movement input comprises a dragging touch-based input.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
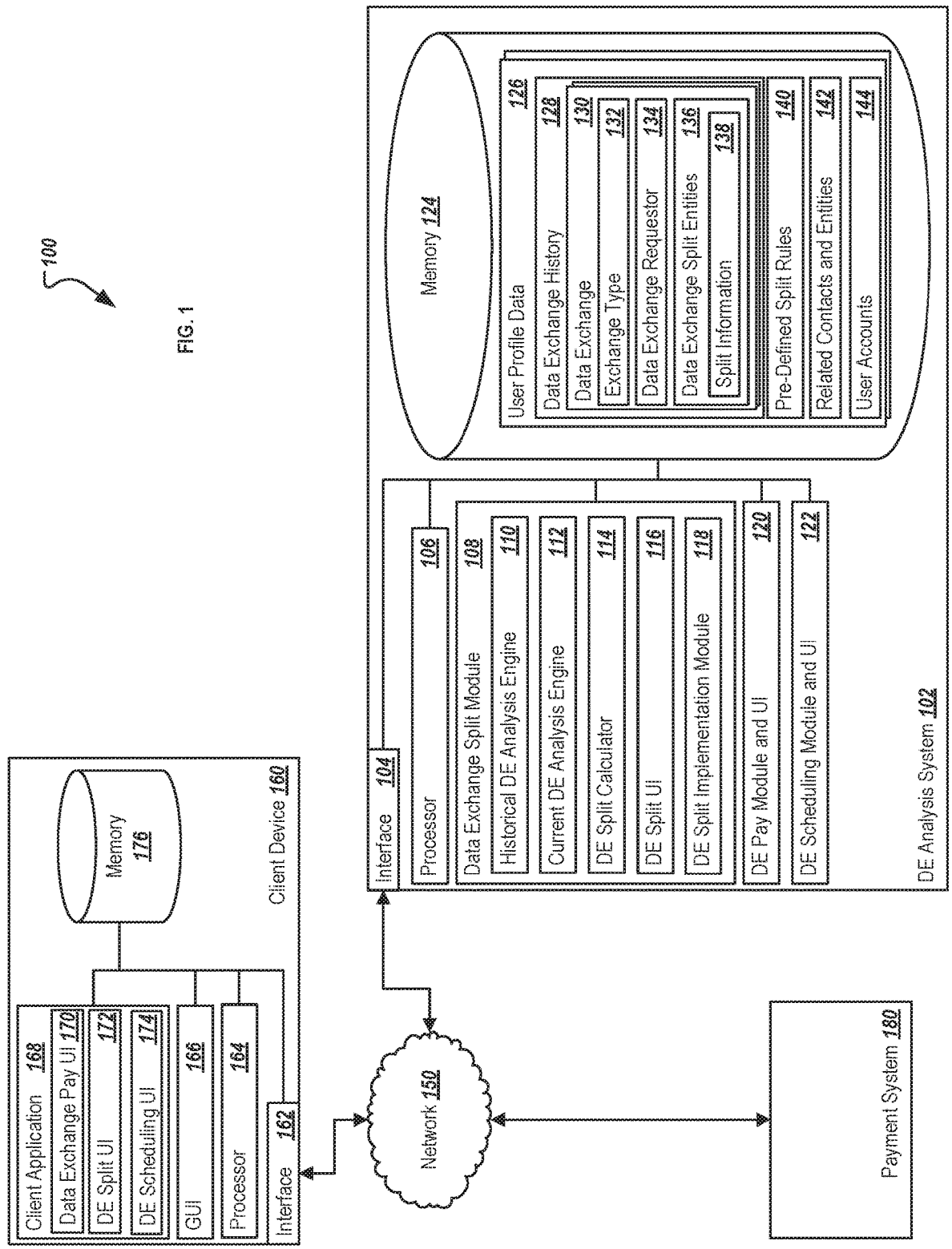
FIG. 1 is a block diagram illustrating an example system for analyzing and performing one or more data exchange splits.

The present disclosure describes various tools and techniques associated with processing and adapting particular data exchanges between two or more entities or parties. Data exchanges may include, but are not limited to, bill payments, responsibility sharing and assignments, relative value splits between entities, and other similar actions. In the present example, the splitting of particular bill payment requests may be used as a proxy for these various data exchanges for ease of description, but such an example is not meant to be limiting.

In a first solution described herein, data exchange applications and related websites are provided enhanced functionality for automatically predicting and/or anticipating splits of particular data exchange requests based on historical data exchange handling associated with a particular user and that user's profile. As data exchange requests are split over time, a historical data exchange repository can be updated for the particular user profile. Each data exchange may be associated with a particular requestor (e.g., Acme Energy Company) or a particular category or data request type (e.g., household services, ride sharing, restaurants and entertainment, among others), as well as any or other suitable parameters, whether explicitly defined, implied based on certain data, metadata, or other information associated with the request, or otherwise determined dynamically. In some instances, each data exchange may be later analyzed to identify additional parameters specific to the request. For some of the data exchange requests, the request may be split among two or more entities. As those data exchanges are split, particular patterns of splits (e.g., common payees, split amounts, etc.) can be identified, in which some of the patterns may be associated with or otherwise correlated to one or more parameters of the corresponding data exchange request.

In response to receiving a new data exchange request (e.g., an incoming bill for electricity associated with a shared location such as a co-working space), a receiving user may request (e.g., through a mobile application or through a website associated with the data exchange request) to split the data exchange among one or more other entities. In response to the request, or alternatively, automatically and without user input in response to identifying the requested data exchange, the disclosed system herein can perform an automated process to automatically recommend, suggest, or implement a particular data exchange split based on the historical data exchange information and prior splits performed by or associated with the user. The automated process can include, for example, parsing data associated with or defined by the requested data exchange to identify one or more parameters associated therewith. Example parameters can include a type (i.e., explicitly defined or implicitly derived) of the request, a type of goods or services associated with the request (if identified), the originator (e.g., payee) of the request, the person, entity, or address to whom or to which the data request was provided, a value amount associated with the request, or any other suitable information, including combinations thereof. In some instances, a geo-location of where the data exchange request is received (e.g., from GPS of a client device, or based on derived data from an available network) can be included in the parameters, as well as one or more users relatively close or around a user when the data exchange request is identified or received. Additionally, a time or date of a particular data exchange request may be used to match the current data exchange request to one or more prior or completed data exchanges occurring at similar dates (e.g. monthly intervals), times (e.g. a time of day), or other analyzed similarities. Using this information, a type of split and/or a particular group or others to split the data exchange with may be determined based on historical or similar prior data exchange splits. New data exchange requests can be compared to previous data exchange splits to identify splits in the newly received data exchange.

Once the particular parameters of the current data exchange request are identified, the historical data exchange repository storing information associated with prior data exchanges and how those data exchanges were handled (e.g., whether split or not, amounts and/or percentage splits, etc.) can be searched and analyzed to determine whether similar prior data exchanges can be matched to or associated with the parameters of the current data exchange request, and, if so, one or more split parameters associated with those matching historical data exchanges. Matches may be determined using any suitable comparison method, and may be based on one or more similarities, or a relative strength of similarities for the items. For example, originators may be matched to the originators of prior data exchanges and data exchange requests. Similarly, where a particular data exchange request has a particular parameter of a defined type, or is known to be associated with a type of good or services (e.g., household goods or services), the data exchange split action or non-action taken on prior data exchange requests associated with the same type may be used as an example template or suggested split for the current data exchange, or weighted as part of the determination of the suggested split where multiple prior data exchanges match or correspond to the current data exchange's identified parameters. Machine learning techniques and systems can be applied to the determination, such that unique rules can be determined and updated as new data exchange requests are received and new data exchange splits applied. A set of proposed data exchange split parameters for the current data exchange request can be identified based on the analysis. In some instances, the proposed data exchange split parameters can be proposed to the user associated with the request, such as through a notification or other message via an appropriate user interface or application. The proposed split parameters may be selectable such that the proposed split can be implemented in response to a user acceptance or similar interaction. In other instances, the proposed data exchange split parameters can be used to automatically populate and/or assign a split of the received data exchange request without further user input or interaction. In those instances, recurring data exchanges (e.g., electricity bills, rent checks, etc.) may be associated with constant parameters, including but not limited to one or more of a date of receipt, an amount, a particular originating entity associated with the request, or a particular location or other parameter associated with the data exchange, as well as any other suitable information. When new data exchange requests associated with those constant parameters are received, the system can automatically perform operations associated with the data exchange split, or can automatically populate a data exchange split UI with the expected splitting of said received data exchange.

The automatic determination of particular data exchange splits can significantly shorten processing and consideration time associated with received data exchanges. Multiple individuals or parties do not need to be added or input individually, and previously used splits can be applied to newly received bills automatically. Time and effort can be minimized by saving time splitting regular data exchanges (e.g., payments), avoiding the need to calculate specific percentage contributions, or require a first person to initially manage a shared data exchange request and subsequently track down or request input or contribution from other users. Further, the automatic determination can increase convenience and trust in splits by using previously-used and accepted splits in new data exchanges.

In a second solution described herein, a data exchange split UI and associated interactions are described. The data exchange split UI allows for new methods for users to manipulate, via an interactive user interface, splits of particular data exchanges without manual input of specific values. In some instances, the described solution can provide a single hand operable and significantly intuitive method of splitting data exchange requests using sliders and/or interactive charts. In some examples, for instance, a data exchange may be identified to split between two or more entities or persons. A user interacting with the data exchange split UI may be provided with an interactive chart, such as a circular pie chart illustrating a first value split of the values associated with the requested data exchange. In some instances, the total value may be represented as 100% of the pie chart, where a first set of percentages are associated with each of the entities. Via inputs provided through the data exchange split UI, a user can identify a particular adjustment to the current split through one or more interactions.

A first interaction may include a selection of a value area specific to a particular entity. The selection may be based on a touch or mouse input on the value area of the particular entity. Through movement interactions with the UI (e.g., a touch-and-hold input followed by a slide to the left or right or up and down), the selected value area associated with the selected entity can be increased or decreased. During such an input, the value areas of the other particular entities can be proportionally increased or decreased based on the received movement input in combination with the change to the selected value area. In some instances, one or more of the other value areas associated with the other particular entities may be locked prior to receiving the input, such that the value areas of those other entities may not be modified when the selected entity's value area is modified.

A second interaction may include a selection of an edge connecting two value areas associated with two of the plurality of entities associated with the potential data exchange split. In response to the selection of the edge, the non-selected value areas of the other entities can be locked during the interaction. The combined value of the two value areas associated with the two entities connected by the selected edge can then be manipulated through one or more user interactions, including a swipe-left, a swipe-right, a swipe-up, or a swipe-down, among others. As inputs are received through this example interaction, only the proportional value of the combined value of the two value areas is modified without altering or affecting the value areas of the other entities not associated with the selected edge.

Other interactions are possible, including those entered manually, adjusted via a value slider presented adjacent to the interactive chart, or through one or more other suitable inputs. Other touch-based inputs associated with any interaction may include a circular swipe to identify a group of particular value areas to be locked, thereby allowing the total value associated with those locked value areas to be adjusted, in some cases with more than two value areas in the selected group of value areas. In some instances, holding a gesture or input or repetitive tapping to a particular value area can be used to slowly increase (or decrease) the relative share of that value area. In some instances, particular periods of holding or each tap can be associated with a particular increase or decrease amount or percentage. In some instances, using gestures to increase or decrease the size of a particular value area may cause the two edges of the particular value area to move equal distances or an equal amount for each increase or decrease in value. While described as a pie chart in the example interactions above, any suitable interactive presentation of the values or percentages associated with plurality of entities associated with the split can be used, including bar graphs and other possible charts.

Turning to the illustrated example implementation, FIG. 1 is a block diagram illustrating an example system 100 for analyzing received data exchange requests and performing one or more data exchange splits. System 100 includes functionality and structure associated with automatically determining one or more proposed data exchange splits for a particular data exchange based on historical data exchange split operations, as well as for interacting with a data exchange split UI specifically provided for users to identify and/or manipulate proposed data exchange splits via UI interactions. Specifically, the illustrated system 100 includes or is communicably coupled with a data exchange analysis system 102, a client device 160, one or more payment systems 180, and a network 150. System 100 is a single example of a possible implementation, with alternatives, additions, and modifications possible for performing some or all of the described operations and functionality. Although shown separately, in some implementations, functionality of two or more systems or servers may be provided by a single system or server. In some implementations, the functionality of one illustrated system or server may be provided by multiple systems, servers, or computing devices, including those physically or logically local or remote to each other. Any combination or permutation of systems may perform the functionality described herein. In some instances, UI-related functionality may be executed at either the client device 160 or the data exchange analysis system 102 or a combination thereof.

As used in the present disclosure, the term "computer" is intended to encompass any suitable processing device. For example, client device 160, data exchange analysis system 102, and the payment systems 180 may be any computer or processing device (or combination of devices) such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 160 may be any system which can request data, execute an application, and/or interact with the data exchange analysis system 102. The client device 160, in some instances, may be any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™ Windows Phone OS, or iOS™, any real-time OS among others.

As illustrated, the data exchange analysis system 102 includes an interface 104, a processor 106, a data exchange split module 108, a data exchange pay module and UI 120, a data exchange scheduling module and UI 122, and memory 124. Interface 104 is used by the data exchange analysis system 102 for communicating with other systems in a distributed environment—including within the environment 100—connected to the data exchange analysis system 102 and/or network 150, e.g., client device(s) 160, payment system(s) 180, as well as other systems or components communicably coupled to the network 150. Generally, the interface 104 comprises logic encoded in software and/or hardware in a suitable combination and operable to communicate with the network 150 and other communicably coupled components. More specifically, the interface 104 may comprise software supporting one or more communication protocols associated with communications such that the data exchange analysis system 102, network 150, and/or interface's hardware is operable to communicate physical signals within and outside of the illustrated environment 100.

Network 150 facilitates wireless or wireline communications between the components of the environment 100 (e.g., between combinations of the data exchange analysis system 102, client device(s) 160, and/or the payment system(s) 180, among others) as well as with any other local or remote computer, such as additional mobile devices, clients, servers, remotely executed or located portions of a particular component, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components (e.g., the data exchange analysis system 102) or portions thereof (e.g., the data exchange split module 108) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN) or an Intranet. Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

The data exchange analysis system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the data exchange analysis system 102, in particular those related to executing the various modules 108, 120, 122 and related functionality. Specifically, the processor 106 executes the algorithms and operations described in the illustrated figures, as well as the various software modules and functionalities, including the functionality for sending communications to and receiving transmissions from the client devices 160 and/or the payment system(s) 180, as well as to other devices and systems. Each processor 106 may have a single core or multiple cores, with each core available to host and execute an individual processing thread. In some instances, a cloud-based solution may use one or more remotely or otherwise available processors 106 and their cores to allow for further operations and optimization of operations via parallel processing.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

As illustrated, the data exchange analysis system 102 includes the data exchange split module 108, where the data exchange split module 108 performs the operations to analyze the current data exchange request, identify historical data exchanges similar to the current data exchange request, and to identify a particular set of proposed data exchange splits to be applied or suggested to the current data exchange request based on those similar historical data exchanges. While illustrated as within a single system, some of the components of the data exchange analysis system 102 and the data exchange split module 108 may be divided between two or more systems, servers, and/or components, and may be operated, managed, or otherwise executed by different entities. In some instances, a first system may perform operations in analyzing a particular data exchange request to identify one or more parameters associated with the request, while a second system performs operations in determining whether those identified parameters then match or correspond to a particular one or more previously completed data exchanges.

The data exchange split module 108 may be any application, framework, agent, or other software capable of performing the operations described, and is illustrated as including several components, including a historical data exchange analysis engine 110, a current data exchange analysis engine 112, a data exchange split calculator 114, a data exchange split UI module 116, and a data exchange split implementation module 118. These components may be specifically separate components, may be combined into fewer than illustrated components, or may be a part of the inherent or internal functionality performed by the data exchange split module 108.

The current data exchange analysis engine 112 receives and analyzes a current data exchange request, where the current data exchange request is associated with a particular user profile 126. In some instances, the current data exchange request can be associated with two or more user profiles 126. In those instances, the data exchange request may be analyzed in light of one or more of the user profiles 126, as well as a combination of the user profiles 126, when the historical analysis is performed. The current data exchange analysis engine 112 can use any suitable analysis techniques or tools, and can consider one or more of an evaluation of the content of the request, metadata associated with the request, the particular party or parties originating or sending the request, the particular entity or entities receiving the request or to whom the request is provided or delivered, a time or date when the data exchange request is received, as well as any other suitable information included in, derived from, or connected to the data exchange request. The analysis of the current data exchange request may include a semantic analysis of the content, an identification of particular entities associated with the current data exchange request and/or a derivation or extrapolation of information included in the request that can be connected to or associated with at least one other entity or user profile other than the user profile explicitly associated with the request.

The historical data exchange analysis engine 110 can receive or identify the one or more parameters identified by the current data exchange analysis engine 112 and perform a search or analysis of one or more data exchanges 130 included in a data exchange history 128 repository. Each user profile 126 may be associated with a particular data exchange history 128, where a plurality of data exchanges 130 and a set of information describing or associated with those previously completed exchanges 130 is available in the repository, including for example, a determined or derived exchange type 132, a requester 134 who originated the request for the data exchange 130, entities 136 with whom the data exchange 130 was split (if split, as well as specific information on the split 138 itself). The particular data exchanges 130 may then be searched or analyzed in light of the identified parameters of the current data exchange, such that one or more of the previously completed data exchanges 130 may be identified as similar to the current data exchange request. If only one match is identified, that data exchange 130 may be returned by the historical data exchange analysis engine 110. If multiple matches or relevant data exchanges 130 are found, the historical data exchange analysis engine 110 may return information about the set of matching or associated completed data exchanges 130. In some instances, that information may include a relative ranking of matching or related data exchanges 130. Alternatively, a chronologically organized list of the matching exchanges 130, or a recent subset thereof, may be returned. In some instances, only the most recent data exchange 130 matching the identified parameters may be returned. If no matches are found, or the matches identified do not pass a threshold likeness to the parameters, that information can be returned and, in some instances, a default split may be returned, or no split information may be returned.

In response to receiving and based on the information about one or more completed data exchanges 130 matching or similar to the current data exchange request, the data exchange split calculator 114 can perform operations to evaluate and propose a particular split. In some instances, the proposed split may identify at least one other entity with whom to split the particular data exchange. In some instances, the proposed split may identify a relative split between those particular entities. In some instances, a proposed percentage may be generated for the split among the different entities. In some instances, an actual amount for each entity may be calculated based on the proposed percentages between entities and the actual total (or to be split) amount.

The data exchange split UI 116 can comprises a UI designed to present information and recommendations about the proposed split to a user. The user may be associated with a particular client device 160 (or client application 168). In instances where the data exchange split UI 116 is provided via a web page, the data exchange split UI 116 can generate an appropriate visualization and provide that visualization to a client device 160 associated with the particular user profile 126 in charge of or responsible for the data exchange split determination. Examples data exchange split UIs 116, as well as interactions associated with the presentation of those UIs, are illustrated in FIGS. 4-8, although any suitable UI and presentation can be used, including non-graphical, or text-based, presentations for the user. In some instances, information about the proposed split parameters can be presented textually, while data exchange split UI 116 is provided to the user allowing them to input those proposed split parameters, if desired. In other instances, the data exchange split UI 116 may be initially provided with splits corresponding to those proposed split parameters. In some instances, the data exchange split UI 116 may be associated with a client application 168 (e.g., a mobile application), where the information associated with the proposed split is provided to the client device 160 and client application 168, and the client application 168 includes a data exchange split UI 172 locally at the client device 160 that manages the interactions associated with the split.

The data exchange split implementation module 118 provides the functionality for receiving and implementing the splits defined by the user (or alternatively, those automatically used for a particular data exchange based on the historical analysis). In some instances, the data exchange split UI 116 can include or provide a confirmation or acceptance control that can be selected by the user. In response to the control's selection or any other suitable means of accepting or defining the split, the data exchange split implementation module 118 can enact the split via backend data exchange processes. In some instances, those operations may include causing an action to be performed by the particular user associated with the particular user profile for their portion of responsibility within the split, while causing actions to be provided to, requested to, or otherwise handled by the other user profiles and/or entities associated with the remaining split responsibility of the data exchange. In some instances, the data exchange split implementation module 118 can use one or more payment systems 180 to perform the particular user profile's responsibility for the currently requested data exchange, while information or a notification of the particular split and the corresponding responsibilities is provided to the appropriate system. In some instances, after a split is complete, the portion of the data exchange for which the particular user profile is responsible or associated with may be a dollar or value amount associated with a transaction. In such cases, responsibility for completing the transaction may be provided to the user via the data exchange pay module and UI 120.

The data exchange pay module and UI 120 may include a payment processing application, and may be executed via a web page, portal page, or through a client-side application (e.g., the client application 168). The data exchange pay module 120 can provide functionality for receiving the amount due in a monetary transaction and completing the transaction via one or more payment rails, such as those associated with one or more payment systems 180. The UI associated with the data exchange pay module and UI 120 may be any suitable user interface providing payment functionality.

In some instances, the user may initially be provided a choice as to how to handle or process a particular data exchange request, where the options may include process the data exchange now (e.g., "Pay Now"), split the data exchange (e.g., "Split the Bill"), or schedule a later time to process the data exchange (e.g., "Save for Later"). If the user elects to process the data exchange without a split, or schedules a later time for processing of the data exchange, the data exchange split module 108 may not be used. In other instances, the data exchange split module 108 may consider all, or a subset of, received data exchange requests regardless of whether the user elects to perform a split.

Where the user elects to "Pay Now," the process may immediately be handled by the data exchange pay module and UI 120. Alternatively, if a delayed processing is performed, the data exchange scheduling module and UI 122 may handle initial processing of the data exchange request. The data exchange scheduling module and UI 122 can provide functionality related to scheduling future processing of the received data exchange request, or a time at which the received data exchange request is to be completed. In some instances, the data exchange scheduling module and UI 122 may be used in combination with a request to split the data exchange, where the split or performance of a particular responsibility associated with a split are scheduled for future completion.

As illustrated, the data exchange analysis system 102 includes memory 124.

In some implementations, the data exchange analysis system 102 includes a single memory or multiple memories. The memory 124 may include any type of memory or database module and may take the form of volatile and/or non-volatile memory including, without limitation, magnetic media, optical media, random access memory (RAM), read-only memory (ROM), removable media, or any other suitable local or remote memory component. The memory 124 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the data exchange analysis 102. Additionally, the memory 124 may store any other appropriate data, such as VPN applications, firmware logs and policies, firewall policies, a security or access log, print or other reporting files, as well as others. As illustrated, memory 124 includes, for example, the plurality of user profiles 126. Memory 124 may be local to or remote to the data exchange analysis system 102, and may be available remotely via network 150 or an alternative connection in such instances where not locally available. Further, some or all of the data included in memory 124 in FIG. 1 may be located outside of the data exchange analysis system 102, including within network 150 as cloud-based storage and data.

As illustrated, the user profiles 126 may be associated with a plurality of users related to the data exchange systems described herein. As noted, each user profile 126 may be associated with a corresponding data exchange history 128, where a plurality of previously completed data exchanges 130 are stored along with information associated with those exchanges 130, including information defining how prior exchanges 130 were handled, particular in regards to one or more data exchange splits between entities. In addition to those portions described above, each user profile 126 may be associated with one or more predefined split rules 140 that can be used to define how particular data exchange requests may be split, where appropriate. The predefined split rules 140 may be dynamically based on actions, tendencies, and preferences as monitored in one or more prior data exchanges completed by the user associated with the user profile 126, or they may be manually defined by the user associated with the user profile 126 and/or an administrator acting on the user's behalf. The split rules 140 may be generated based on machine learning. The split rules 140 can be associated with particular patterns or parameters, such that the parameters identified by the current data exchange analysis engine 112 can be compared to parameters associated with specific rules 140 by the historical data exchange analysis engine 110 or another suitable component.

As illustrated, the user profiles 126 may also include a list of one or more related contacts or entities 142. Those may be based on prior data exchanges 130, contact lists associated with the user profile 126, or any other suitable means of identifying those persons. The related contacts and entities 142 may be provided as suggested potential split entities during the split process where the user manually requests to associate one or more persons or entities with a particular data exchange split. In some instances, the related contacts and entities 142 may include information for contacting the persons or entities identified therein, including information on phone numbers, email addresses, user names, and other identifiers or personal information that can be used by, for example, the data exchange split implementation module 118 to actually enforce the split and notify those entities of their responsibility associated therewith.

The user accounts 144 identify one or more accounts associated with the user profile 126, in particular one or more payment accounts or identifiers that may be used to complete data exchanges associated with a bill or other payment. In some instances, the user accounts 144 may also identify one or more client devices 160 associated with the user profile 126. That information can be used to provide notifications and information to the appropriate client devices 160 associated with a data exchange and/or a particular split.

The payment systems 180 may be used to assist in facilitation of one or more payments associated with a data exchange or assist in facilitating the data exchange split implementation, where appropriate. The payment systems 180 may be a system, server, or other computing device associated with a particular entity, business, platform, or computing system with which financial operations can be performed. In some instances, the payment systems 180 may be associated with a particular financial institution, while in others, the payment systems 180 may be associated with a particular payment system or platform.

Illustrated system 100 includes at least one client device 160, and may include a plurality of the client devices 160 in some instances. Each client device 160 may generally be any computing device operable to connect to or communicate within the system 100 via the network 150 using a wireline or wireless connection. In general, the client device 160 comprises an electronic computer device operable to receive, transmit, process, and store any appropriate data associated with the system 100 of FIG. 1. The client device 160 can include one or more client applications, including the client application 168. In some instances, the client device 160 may comprise a device that includes an input device, such as a keypad, touch screen, or other device(s) that can interact with the client application 168 and other functionality, and an output device that conveys information associated with the operation of the applications and their application windows to the user of the client device 160. Such information may include digital data, visual information, or a graphical user interface (GUI) 166, as shown with respect to the client device 160. In general, client device 160 comprises an electronic computer device operable to receive, transmit, process, and store any appropriate data associated with the environment 100 of FIG. 1. In particular, the client devices 160 can be associated with one or more data exchanges, such as those associated with one or more data exchange splits, which may be associated with the data exchange analysis system 102 and its operations.

Client application 168 can be any type of application that allows the client device 160 to request and view content on the client device 160. In some instances, client application 168 may correspond with one or more backend applications or functionality, including an application or platform associated with the data exchange analysis system 102. Users may interact with the client application 168 to review data exchanges, such as bills and payment requests, and can allow the user to facilitate or initiate payment of those bills or requests, as well as split responsibility for the payments via the client application 168 and one or more interactions via GUI 166. In some instances, the client application 168 may be an agent or client-side version of the one or more applications or services running on a backend system, such as an agent or client-side version of the applications and systems using or associated with the data exchange system 102. In the present solution, the data exchange analysis system 102 and its components may execute on the backend while the client application 168 manages presentations of the various UIs associated with a particular data exchange, including one or more of the data exchange split UI 116, data exchange pay module 120, and the data exchange scheduling module 122. In fact, the client application 168 may include client-side components or functionality associated with those UIs, as illustrated by the client-side data exchange pay UI 170, the data exchange split UI 172, and the data exchange scheduling UI 174. In some instances, the client application 168 may provide access to the backend systems via a web page or portal, acting as a client-side web browser or shell associated with the backend functionality. In others, at least some of the functionality, including the interpretation of particular input actions at the client device 160, can be interpreted and applied at the client device 160, such as changes to a proposed data exchange split.

In many instances, the client device 160 may be a mobile device, including but not limited to, a smartphone, a tablet computing device, a laptop/notebook computer, a smartwatch, or any other suitable device capable of interacting with the data exchange analysis system 102 and/or any other suitable systems or networks. One or more client applications 168 may be present on a client device 160, and can provide varying functionality. In some instances, client application 168 may be a web browser, mobile application, cloud-based application, or dedicated remote application or software capable of interacting with at least some of the illustrated systems via network 150 to request information from and/or respond to one or more of those systems.

As illustrated, the client device 160 may also include an interface 162 for communication (similar to or different from interface 104), a processor 164 (similar to or different from processor 106), memory 176 (similar to or different from memory 124), and GUI 166. GUI 166 can interface with at least a portion of the environment 100 for any suitable purpose, including generating a visual representation of the client application 168, presenting a pop-up or push notification or preview thereof, or any other suitable presentation of information, including the interactive visualizations related to the data exchange split process. GUI 166 may also be used to view and interact with various Web pages, applications, and Web services located local or external to the client device 160, as well as information relevant to the client application 168 and any received notifications and communications sent from the data exchange analysis system 102. Generally, the GUI 166 provides the user with an efficient and user-friendly presentation of data provided by or communicated within the system. The GUI 166 may comprise a plurality of customizable frames or views having interactive fields, pull-down lists, and buttons operated by the user. For example, the GUI 166 may provide interactive elements that allow a user to view or interact with information related to the operations of processes associated with the data exchange analysis system 102 and any associated systems, including those associated with or connected to data exchange analysis system 102, among others. In general, the GUI 166 is often configurable, supports a combination of tables and graphs (bar, line, pie, status dials, etc.), and is able to build real-time portals, application windows, and presentations. Therefore, the GUI 166 contemplates any suitable graphical user interface, such as a combination of a generic web browser, a web-enabled application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
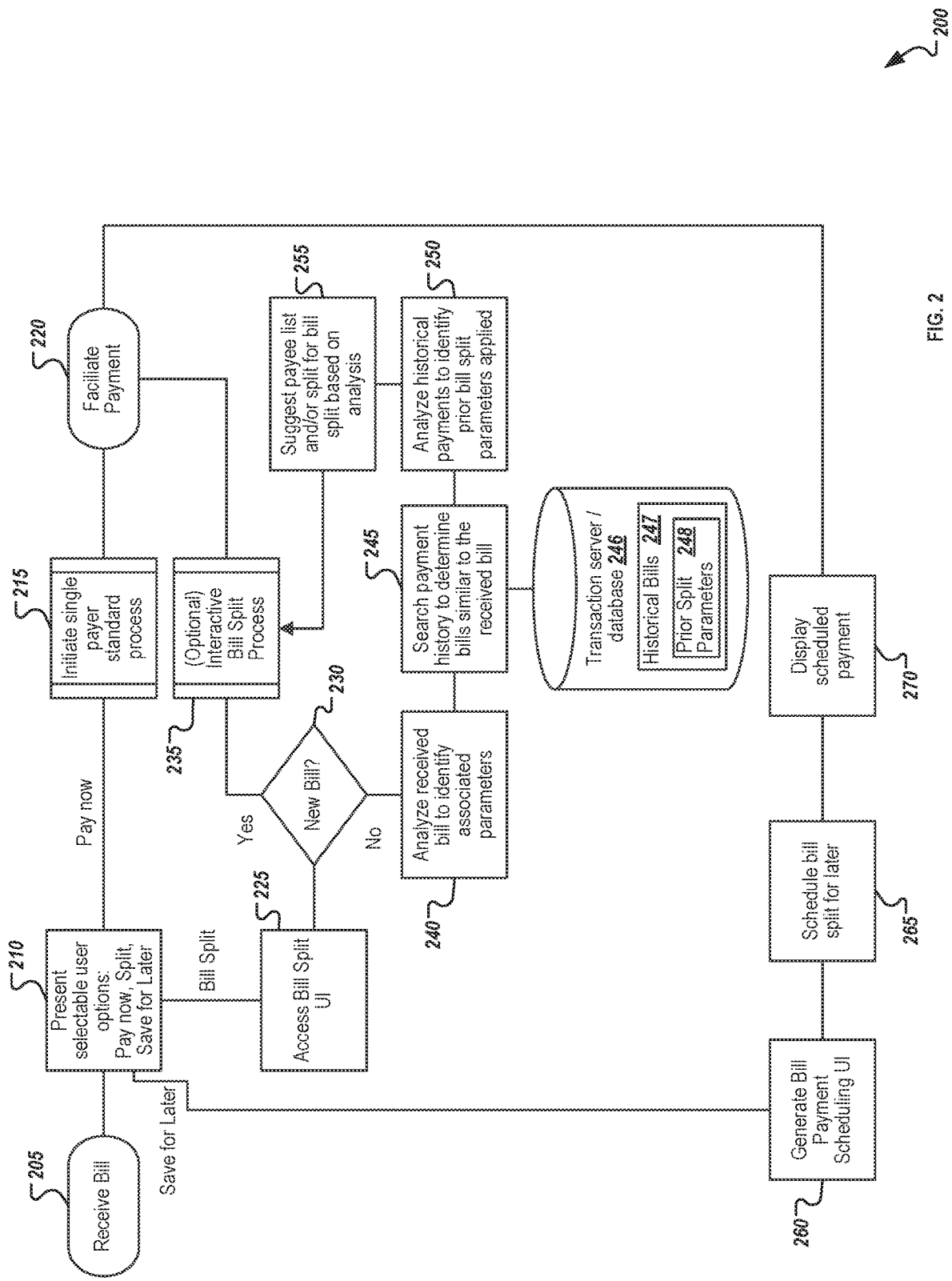
FIG. 2 is a flowchart of an example method for providing users the ability to split one or more data exchanges among two or more users.

FIG. 2 is a flowchart of an example method for providing users the ability to split one or more data exchanges among two or more users. In addition, FIG. 2 provides an illustration of how the historical analysis process and the data exchange split UI can be combined in certain implementations. The illustrated flow is meant to be a set of example operations performed in connection with the two solutions, and is not meant to be limiting in scope. For purposes of illustration, the particular data exchange in FIG. 2 relates to a bill payment scenario.

At 205, a new bill is received in association with a particular user, the particular user associated with a user profile. In some instances, the new bill can be received via a financial application (e.g., a banking or credit card-related mobile app). In some instances, the bill may be associated with a collection of transactions (e.g., a credit card bill), or the bill may be associated with a particular transaction, such as a particular good, service, or utility. In response to receiving the bill, at 210, the user may be presented with options for handling the received bill, including a pay now option, a bill split option, and a save for later option.

If the user selects pay now, the operations may continue at 215, where a single payer process is initiated through standard payment channels, such as through the application or via a website or payment portal associated with the received bill. Once the single payer process is completed, the payment is facilitated at 220 in any suitable method.

If the user elects to save the bill for later, operations can move to 260, where a suitable bill payment scheduling UI is presented. In some instances, the user may be directed to a specific web page, portal page, or application (or application functionality) associated with scheduling a future payment, including a bill split. In some instances, at 265 a bill split can be scheduled for a particular date and/or time. At 270, the scheduled date for handling or further processing the bill can be displayed, such as for confirmation. At the appropriate time defined in the process, the bill can be handled, either through the single payer process or through a bill split process as appropriate. In some instances, the process may return to 210 at the date and/or time specified, providing the user the option of paying the bill without splitting, splitting the bill, or again saving the bill for later. In some instances, the bill payment scheduling may be performed in association with a bill split process, where the bill is split using example operations 225-255, but the facilitation of the payment at 220 is delayed until the specified time.

In response to the user selecting to perform a bill split. The operations move to 225, where a bill split UI can be accessed. The bill split UI may be associated with a particular web page, portal page, or application functionality associated with the bill split process. Prior to presenting the bill split visualizations (e.g., including those illustrated in FIGS. 5-8), an automatic analysis of the received bill can be executed.

In some instances, at 230, a determination is made as to whether the received bill is a new bill. New bills may be a first bill from a particular originator or payee of the bill, such as a goods or service provider. In some instances, when a first bill from a particular originator is received, no further processing of the bill may be initially performed. The bill can then be provided to the interactive bill split process described by the flow of FIG. 4 and the illustrations of FIGS. 5-9 without providing specific proposed bill split parameters associated with the bill split. In those instances, users may be required to identify particular persons or entities with whom the bill should be split, and manually modify the parameters without input from previously paid bills. In other instances, the determination may be delayed until after the received bill is analyzed and compared to previously paid bills as described in operations 240, 245, and 250.

Figure 3:
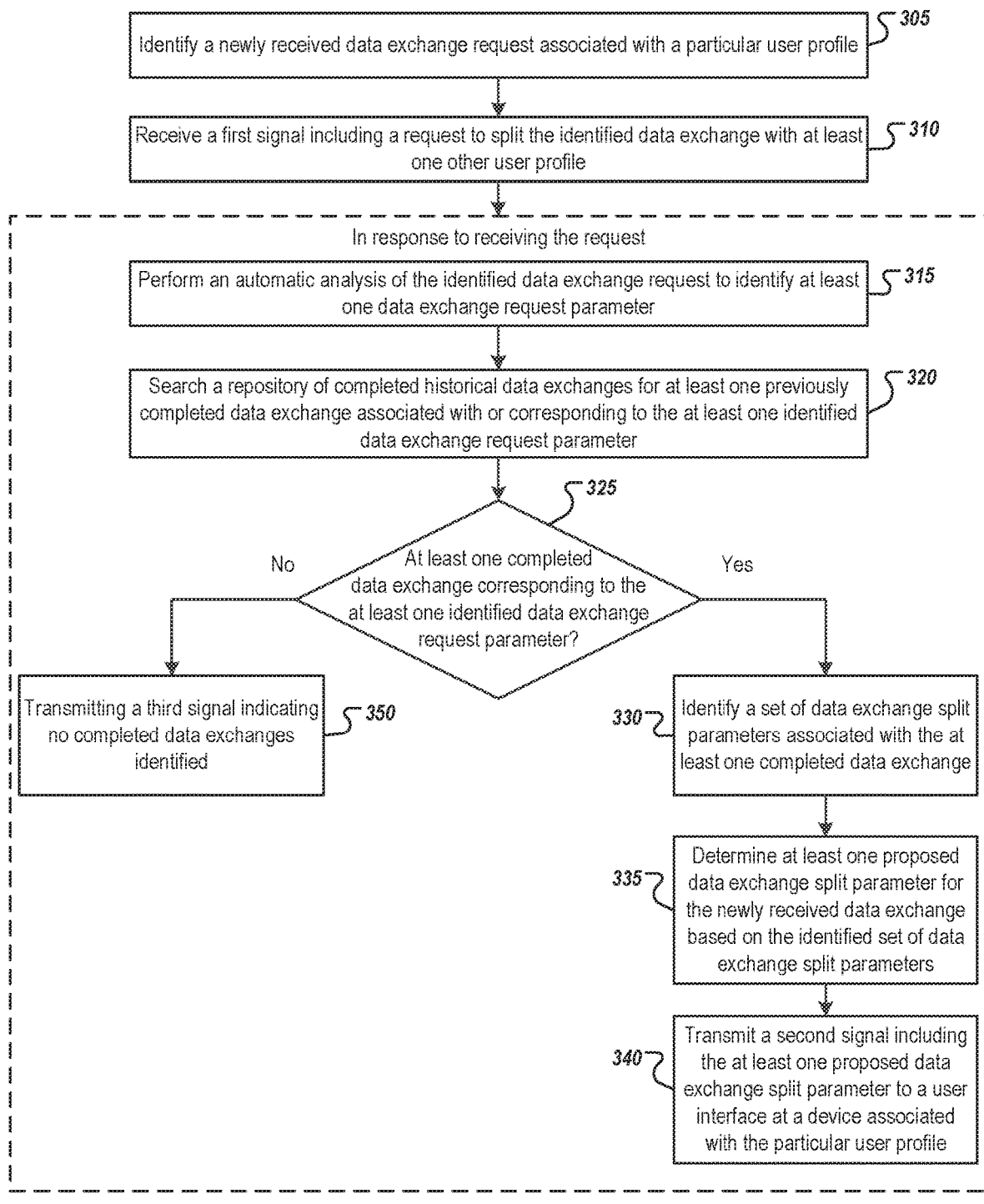
FIG. 3 is a flowchart of an example method for analyzing a current data exchange to identify at least one parameter for use in identifying at least one proposed data exchange split recommendation based on one or more historical data exchange splits.

The operations described here are described in further detail in FIG. 3. The descriptions here are meant to provide a high-level description of the operations in the high-level process. At 240, the received bill can be automatically analyzed to identify one or more parameters associated with the received bill. Those parameters are then used to search (245) a transaction server or database 246 storing information on previously paid bills of the user associated with the user profile, where those historical bills 247 include one or more prior split parameters 248 (e.g., including an indication that a prior bill was not split). The search can determine whether any of the previously paid bills are associated with parameters corresponding to or associated with those parameters associated with the newly received bill. Based on this information regarding one or more (or zero) historical bill payments, the prior split parameters 248 of those relevant historical bills 247 can be analyzed to identify the prior bill split parameters applied to those relevant historical bills 247. In some instances, the split parameters may be similar to one another, in that the split parameters applied to particular relevant historical bills 247 can be used as a suggested or automatically applied set of bill split parameters. In some instances, only the most recent bill matching the identified parameters of the newly received bill may be considered, such that how that previous bill payment was made is then applied as the suggested or proposed bill split parameters for the interactive bill split process of 235.

At 255, a payee list and/or a particular value split for the current bill split can be provided or suggested based on the identified relevant historical bills 247 and the analysis of their prior bill split parameters 248 as performed at 250. The list and/or value split can be used as an initial input to the interactive bill split process 235, or as a communication to the user associated with the bill split process. In some instances, a pop-up or other notification may be provided to the user. If the user interacts with the notification to accept the proposed split, the interactive bill split process can be set to the split parameters identified at 250. In other instances, the proposed bill split parameters (suggested at 255) may be automatically applied as the starting values and/or entities in the interactive bill split process 235. In some instances, the proposed bill split parameters can be determined at 250 and 255, and can be automatically implemented without further user input. Alternatively, a different bill split process can be used in association with the proposed split parameters different to the interactive visualizations described herein. Once the interactive bill split process 235 (described in FIGS. 4-8) is performed, the payment can be facilitated at 220.

As noted, the interactive bill split process 235 is optional, and need not be used to obtain the benefits of the historical analysis solution. Similarly, the historical analysis solution need not be used to obtain benefits from the interactive bill split process 235, such that the historical analysis solution may be optional in some instances.

FIG. 3 is a flowchart of an example method 300 for analyzing a current data exchange to identify at least one parameter for use in identifying at least one proposed data exchange split recommendation based on one or more historical data exchange splits. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1, such as the data exchange analysis system 102 and/or portions thereof.

At 305, a newly received data exchange request associated with a particular user profile is identified. The data exchange request can be identified based on a user selection, receipt of the data exchange request in an inbox or other queue, or in response to any suitable interaction. In some instances, the data exchange request may be received via a particular mobile application (e.g., PayPal app, a financial institution application, etc.), and may be identified in response to receiving a notification about the data exchange request. In some instances, at least a portion of the analysis and operations described in FIG. 3 may be performed automatically and without user input. For example, the user may not perform any actions to identify the data exchange request. Instead, when the request is obtained in an online or background queue, at least the initial set of operations may be performed.

At 310, a first signal may be received including a request to split the identified data exchange with at least one other user profile. In some instances, the first signal may be received from a mobile device associated with a user profile to whom the requested data exchange is sent or provided. In some instances, the first signal may include an identification of one or more other user profiles or entities to be associated with the split of the received data exchange. In other instances, the first signal may only indicate that a data exchange split is to be performed without additional information.

In response to receiving the first signal including the request, a number of operations are performed. At 315, an automatic analysis of the identified data exchange request is performed to identify at least one data exchange request parameter. The automated analysis may include obtaining the data exchange request and performing a semantic analysis on the data request, as well as performing a structured or unstructured analysis of the contents of the data exchange. In some instances, metadata associated with the request, along with any other suitable related information including a key word search or explicit parameters or entries associated with the data exchange request, can be analyzed and/or derived. In some instances, particular fields of the data exchange request, which may be in a predefined format, can be analyzed and used to determine at least some of the data exchange request parameters. The data exchange request parameters may include, but are not limited to, a particular requester of the data exchange (e.g., the entity responsible for the request), information about a classification or type of the data exchange and/or any activities, goods, services, or contents described in or associated with the requested data exchange, an address or location to which the data exchange request was sent to or received at, a date on or time at receipt or sending of the data exchange request, a value amount associated with the received request, or any other suitable information. The requested data exchange can be associated with a value, which may include a level of responsibility, an amount associated with a bill or other payment request, or any other suitable amount. In some instances, the original request may be considered a complete, or 100%, value, such that any splitting may reduce the value portion associated with the particular user profile to less than 100%. As noted, the geo-location at which a particular data exchange request is received can be used to identify or assist in identifying a particular originator of the request, the parties to a request spilt (based on history or an identification of nearby contacts), and possible split percentages for those parties.

At 320, a repository of completed historical data exchanges is searched to identify at least one previously completed data exchange that is associated with or corresponds to the at least one data exchange request parameter identified at 315. At least some of the historical data exchanges can include information about a prior data exchange split performed in completion of the historical data exchange. In some instances, that information may include a set of entities or persons associated with the data exchange split, as well as amounts or percentages corresponding to the data exchange split of those historical data exchanges. Each of the historical data exchanges may be associated with their own set of exchange parameters as well as the data exchange split parameters. For example, at least some of the historical data exchange may be associated fields, metadata, and other parameters similar to various parameters that can be identified in 315. In other instances, the historical data exchanges may be unstructured data without such parameters explicitly identified, such that analysis of the historical data exchanges may need to be performed prior to the search.

At 325, a determination is made as to whether at least one completed data exchange from the repository corresponds to or otherwise matches at least one of the identified data exchange request parameters. In some instances, the determination of 325 may alternatively be whether a prior data exchange has been requested by the requestor of the current data exchange request. Whether one of the completed data exchanges from the repository matches or corresponds to the request parameters of the current data exchange can be based on multiple analysis factors. In some instances, two or more of the request parameters may need to be present and identically met in the historical data exchange to be a match. In other instances, a threshold level of closeness may be met based on a relative determination of closeness between the current data exchange request parameters and the parameters or information associated with the completed data exchange. In some instances, two or more completed data exchanges may have similar parameters or attributes as the current data exchange request, such that two or more potential matches may be identified. In some instances, a relative matching may be determined between the two or more potential matches to identify a relatively better or closer match, such as if relatively more matches are found with a particular completed data exchange, or whether a more important parameter (e.g., requestor) is met by at least one of the completed data exchanges as compared to a lesser important parameter (e.g., date or time of data exchange request). Any suitable parameter or combination of parameters can be used to match or identify prior data exchanges that are similar to the current data exchange request. In some instances, the automated matching alternatively access a calendar associated with one or more of the user profiles, where the calendar entries identify a time, place, and participants in a particular meeting. Identifying the data exchange parameters can include identifying information from a calendar entry (e.g., matched based on an originator of the data exchange request being a business at a location associated with the calendar invite). In some instances, at least some of the information derived or included in the calendar entry that is determined to be associated with the data exchange request can be used as parameters in the matching process.

In response to determining that at least one match or correspondence is found, method 300 continues at 330. At 330, a set of data exchange split parameters associated with the at least one matching completed data exchange are identified. Those split parameters can include, for example, one or more entities associated with the prior split, percentages or relative values associated with the split, or information identifying previous data exchanges did not include a split, among others.

Based on the identified set of data exchange split parameters, a set of at least one proposed data exchange split parameters for use with the newly received data exchange request can be determined at 335. In some instances, split parameters associated with the most recent completed and matching data exchange may be used for the proposed data exchange split parameters. In other instances, a combination of split parameters from two or more completed data exchanges may be applied or included in the proposed split parameters. In some instances, the proposed split parameters can define at least one of a set of entities or other user profiles to be associated with the split or a set of percentages or values to be associated with specific splits. For example, a proposed split may identify user profiles A and B in addition to the particular user profile as recommended entities for the split. The proposed split may also include information indicating that 50% of the data exchange responsibility should be associated with the particular user profile, while 25% of responsibility is associated with each of user profiles A and B.

At 340, a second signal is generated and transmitted to a user interface (e.g., at a mobile device or client system) at a client device associated with the particular user profile, where the second signal includes the at least one proposed data exchange split parameter. In some instances, a data exchange split UI, or information for presentation in the data exchange split UI, is included in the second signal such that a corresponding interactive presentation of the proposed split parameters can be presented. In some instances, the second signal may include instructions or otherwise cause a data exchange split UI to be updated based on the proposed data exchange split parameters, at least for an initial setting or presentation. In other words, instead of a default presentation used in data exchange splits, or an empty split UI, the data exchange split UI can be initialized or otherwise updated to reflect and represent the proposed split parameters. In some instances, the proposed data exchange split parameters may be provided for acceptance or confirmation by the user in the user interface prior to updating the data exchange split UI. In still another instance, the second signal may include instructions causing the proposed data exchange split parameters to be automatically applied to the data exchange and causing further processing to occur based on those split parameters.

If, instead, no matching or corresponding completed data exchanges match the at least one identified data exchange request parameters, method 300 continues at 350, where a third signal can be transmitted, the third signal including an indication that no completed data exchanges were found to match the data exchange request parameters. In some instances, the third signal may not be sent, with the indication of no matching being based on the lack of information returned. In those instances, where a data exchange split UI is provided, a default or initial set of split parameters associated with the process may be used for initial interaction by the user.

Figure 4:
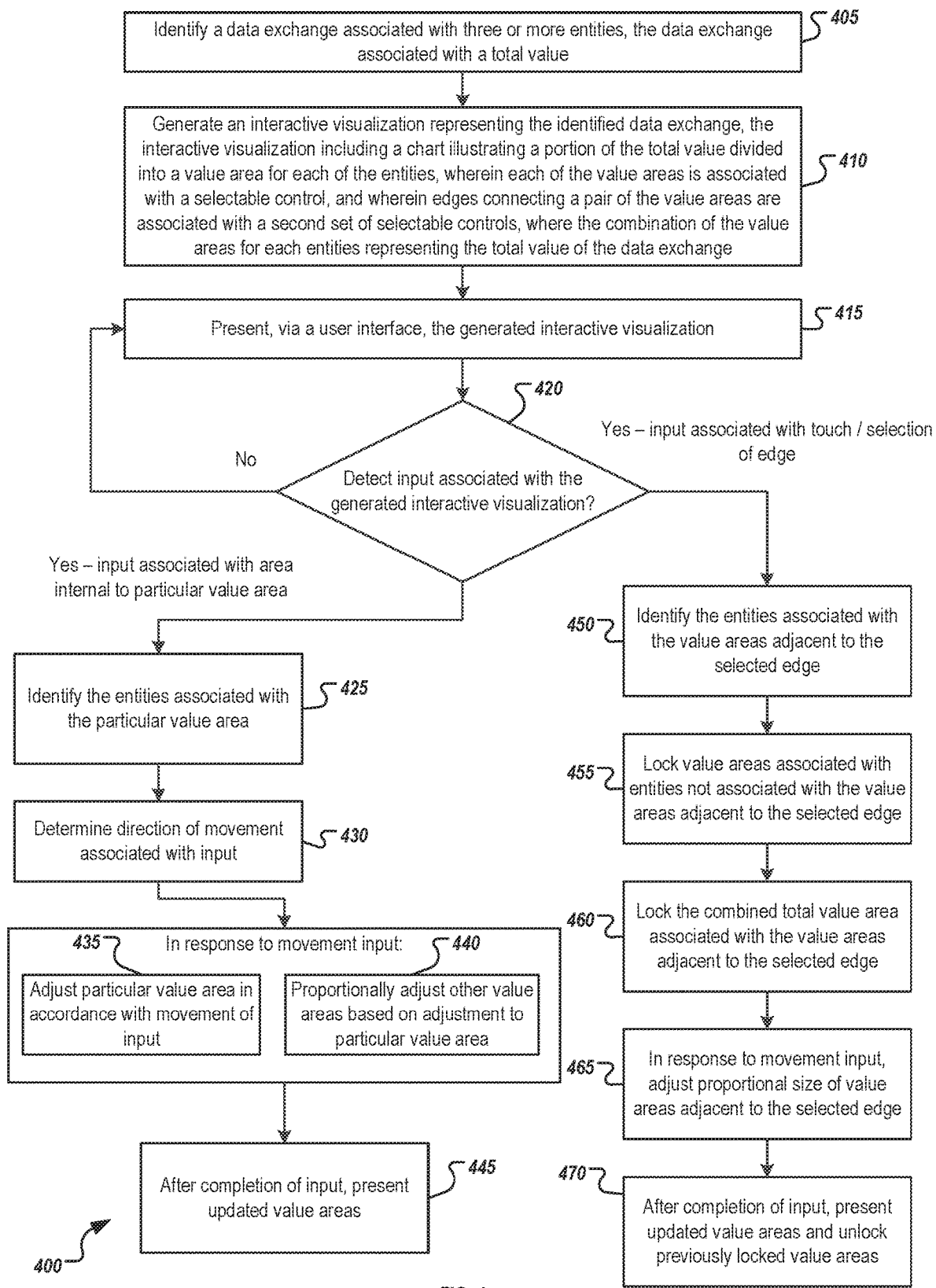
FIG. 4 is a flowchart of an example method for interacting with a data exchange split user interface (UI) to modify and apply custom data exchange splits via a user interface.

FIG. 4 is a flowchart of an example method 400 for interacting with a data exchange split user interface (UI) to modify and apply custom data exchange splits via a user interface. The method 400 may be used in conjunction with the operations of method 300, although such integration of the methods is not required for the benefits of method 400 to be obtained. In general, method 400 describes several example interactions that may take place in an example particular data exchange split UI. It will be understood that method 400 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 400. In some implementations, the method 400 and related methods are executed by one or more components of the system 100 described above with respect to FIG. 1, such as the data exchange analysis system 102 and/or portions thereof, or alternatively, at the client device 160.

At 405, a data exchange associated with three or more entities is identified, where the data exchange is associated with a total value. In some instances, the total value may be a percentage (e.g., 100%), an absolute value (e.g., 50), a dollar amount (e.g. $25.37), or any other suitable value that can be split among splitting entities.

At 410, an interactive visualization is generated, the interactive visualization representing the identified data exchange. The visualization includes a chart illustrating an overall portion of the total value associated with the identified data exchange, where the overall portion of the total value is divided into value areas associated with each of the splitting entities. In generating the interactive visualization, each value area is associated with a selectable control. The selectable control can be selected and manipulated via an input (e.g., mouse input, touch-based input, etc.) to modify the size of the value area associated with the particular splitting entity. Further, two value areas can be connected by an edge separating those value areas. The edges can represent a second set of selectable controls that can be used to modify the responsibility or value represented for the two entities connected by the particular edge, where the responsibility or value area associated with any non-connected value area (i.e., not adjacent to the selected edge) being locked and unchanged while the edge is selected and manipulated. The interactive visualization can include a circular pie chart, a bar graph, or any other suitable visualization where at least two value areas are connected by an edge.

At 415, the generated interactive visualization is provided for presentation to a user interface. In some instances, providing the visualization for presentation may include transmitting instructions for presenting the visualization. In other instances, such as where the visualization is generated on a mobile device or other client device, providing for presentation may include presenting the visualization on a user interface of the mobile device.

At 420, after the visualization is presented, a determination is made as to whether input associated with the presented visualization is detected. Different types of input may be received, including mouse-based input, touch-based input, as well as any other suitable input types. If the determination is that no input has been received, method 400 awaits input or other actions. In response to input being detected, an additional determination is made as to the type of input.

In response to the detected input being associated with a particular value area (e.g., detected touch input is received within a particular value area associated with a particular entity), method 400 continues at 425. At 425, an entity associated with the particular value area is identified. At 430, a determination of a direction of movement associated with the input can be determined. Different directions of movement may include up, down, left, or right, as well as intermediate inputs of those directions (e.g., up and left), with such inputs associated with any suitable input type. In touch-based inputs, pinching or pulling inputs may be received, along with other multi-finger inputs, where those interactions are associated with a requested increase or decrease of the value area associated with the particular value area. In some instances, the detected movement associated with the value area is maintained after an initial input touches or otherwise activates the particular value area, and while the input is maintained and the movement-input is applied. Alternatively, the value area may be initially selected or activated, such that subsequent movement is applied to the value area while the area remains selected. In some instances, the movement input may instead be associated with keyboard or other non-movement input, such as hot keys on a keyboard, numeric pad, or other suitable inputs. The selection input type and the movement input type may differ, for example with a mouse-click input for the selection and a keyboard-based input for the movement input.

In response to the determined movement input, at 435 the particular value area is adjusted in accordance with the detected movement. For example, where a movement to the right is associated with an increase in the value area, the particular value area can be increased within the UI according to the amount of movement detected. In combination with and in response to the detected movement, the other non-selected value areas can be proportionally adjusted based on the corresponding adjustment to the particular value area at 440. For example, if the movement associated with the particular value area is associated with a 10% increase in size, the other non-selected value areas can be proportionally adjusted a combined 10% while the particular value area is expanded.

Once the adjustments are made and input is completed, the visualizations of the value areas (e.g, both the particular value area and the other non-selected value areas) can be updated at 445. The value areas can be updated as input is received, or may be updated on a delay or after the movement input is completed.

Returning to 420, if the detected input is associated with the selection of a particular edge connecting two value areas, method 400 continues at 450. At 450, the entities associated with the value areas adjacent to the selected particular edge are identified. At 455, value areas not adjacent to the selected edge are locked at their current size, or to their current percentage of the overall value. In doing so, further movements associated with the selected edge will only affect the combined subtotal of the values of the value areas adjacent to the selected edge. At 460, the combined value area of the value areas adjacent to the selected edge is also locked, such that inputs associated with increasing or decreasing the values of those adjacent value areas do not change the combined subtotal of those value areas relative to the total value area of all value areas presented in the interactive visualization. Restated, the combined value of the value areas adjacent to the selected edge may originally represent a combined portion of overall total value represented in the interactive visualization. When the edge is selected, that combined portion is locked, such that any input movements associated with the selected edge only modify the split of the combined portion of the overall total value between the two value areas without affecting any other value areas not adjacent to the selected edge.

At 465, movement input can be received, where such movement then adjusts or modifies the proportional size of the value areas adjacent to the selected edge. As noted, the combined portion as a whole is not modified by any such movement, only the individual value areas within the combined portion represented by the two value areas. Similar to other movement inputs described herein, any suitable movement may be used. For example, in some implementations a swipe left may reduce a proportion of a first value area in the combined portion while increasing the proportion of a second value area. In some instances, the swipes may be interpreted relative to the current orientation of the two values areas, such that in some instances a swipe up may increase the first value area while in others, the same swipe up may instead increase the second value area. Other touch inputs, including pinching, swiping, tapping, or other inputs may be used, including using multi-touch gestures. Non-touch inputs may also be used, including keyboard-based hotkey combinations, arrow keys, particular letters, or others. Any suitable input may be used and interpreted as defined in particular implementations.

At 470, after the movement input is completed and, optionally, after the selected edge is no longer selected, updated value areas can be presented and the previously locked value areas can be unlocked for further modification. This includes unlocking the combined portion of the value areas adjacent to the selected edge, as well as the non-adjacent value areas which were locked at 455. The presentation can be updated during said inputs and movements in real-time or near real-time as well, once particular inputs and movements are detected and processed. In some instances, updates may occur based on a particular refresh rate that allows the presentation to appear to be updated in real-time or without users noticing any delay in response to the inputs.

Figure 5:
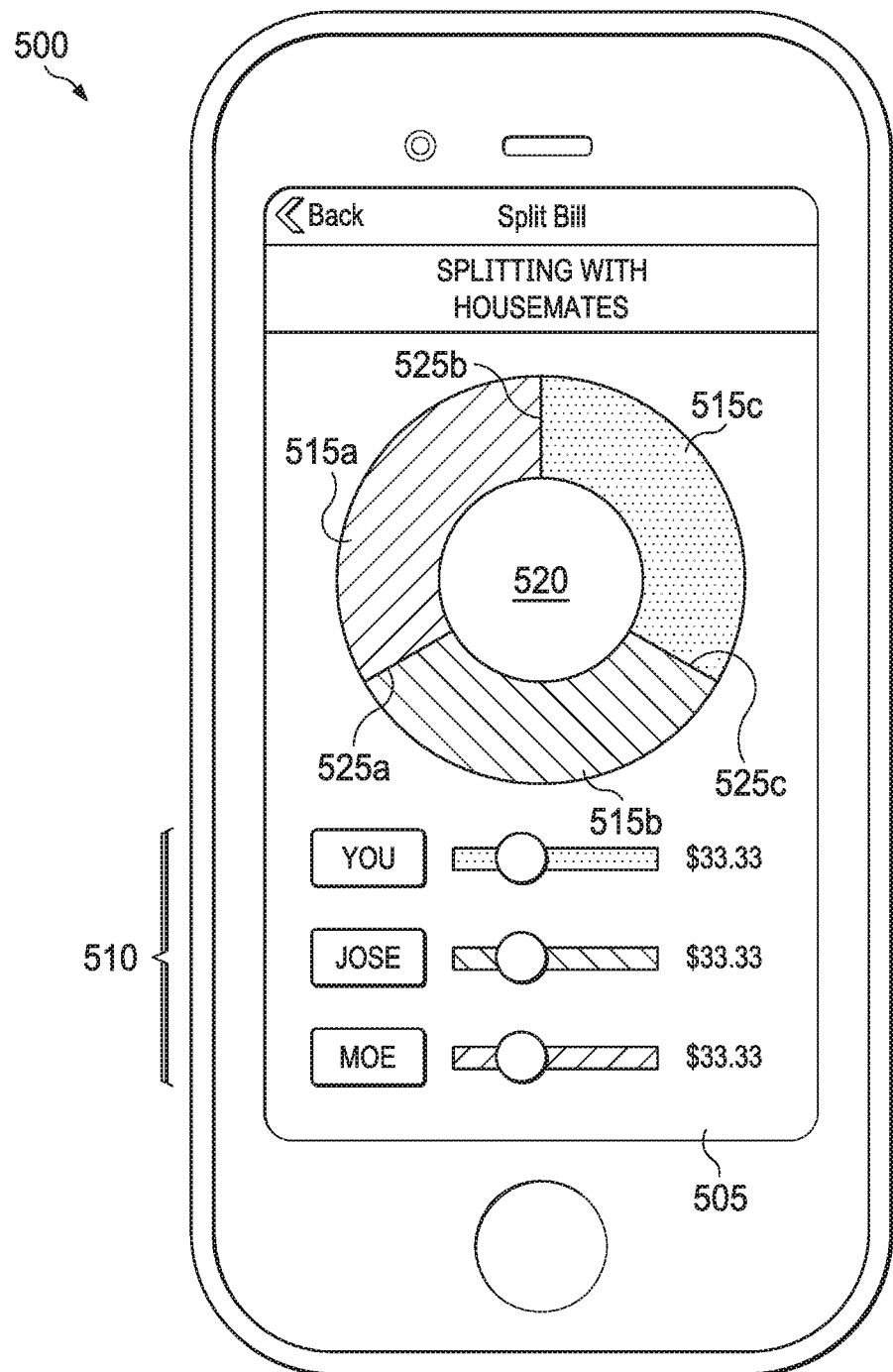
FIG. 5 is an example data exchange split UI in an illustrative implementation.

FIG. 5 is an example data exchange split UI 505 in an illustrative implementation presented on a mobile device 500. As shown, the illustrated UI 505 is available for execution and presentation within a mobile device 500, although other devices may also be used to present the illustrated UI 505. In the present example, the interactive visualization is shown as a circular pie chart or graph, where three different value areas 515a-c are illustrated. Each value area 515a-c may represent a particular entity's portion of a shared or overall responsibility. In the illustrated example, the shared responsibility may represent a bill or expense shared by three example housemates. In the illustrated example, the responsibility is currently split in three (3) equal portions among the different housemates. In some instances, including those described in the description of FIG. 1 and the flow of FIG. 2, prior splits may be analyzed and a set of proposed split parameters can be used to determine or recommend an initial split within the UI 505. In the current example, the illustrated split may be based off such a recommendation (e.g., as an initial state), or the equal split may be a default split in response to identifying three particular entities to split the responsibilities. In some instances, additional details of the particular responsibility may be provided in the UI, including the requestor associated with the requested data exchange (e.g., here the related bill being split), a total value associated with the requested data exchange, and other relevant and suitable information. In some implementations, each value area may include an indication of its current percentage or value, while in other instances, such as that illustrated in FIG. 5, the indication may be provided in a secondary area, such as the illustrated slider area 510.

Each of the value areas 515a-c may be associated with a selectable control that allows users interacting with the mobile device 500 to modify or update the particular percentages or values of a selected value area. In some instances, these modifications or updates can also result in a proportional change in each of the other value areas. Examples of such modifications are found in FIG. 8.

As illustrated, the different value areas 515a-c also meet at defined edges 525a-c, where edge 525a connects value areas 515a and 515b, edge 525b connects value areas 515a and 515c, and edge 525c connects value areas 515b and 515c. The edges 525a-c in the visualization 505 may be selectable as described in FIG. 4, such that, in response to their selection, only the shared portion between the value areas connected to the selected edge 525 is modified without changing the portions associated with the other non-connected or non-adjacent value areas 515. Examples of such modifications can be found in FIG. 9.

As illustrated, a slider area 510 may be used as an optional control for modifying the data exchange splits. Each of the entities associated with a particular data exchange split may have a particular line or control bar for modifying their respective values. Alternatively, when changes are made to the interactive visualization 505, changes to the values in the slider area 510 can be automatically updated based on the change.

In different implementations, any suitable modifications or alternative presentations could be provided for the UI 505. For example, the interactive visualization may present the split as a bar graph, bar chart, or any other suitable presentation. The values areas 515 can be represented by a different color or shade of a particular color in some instances, or may otherwise be distinguished for users to quickly identify the corresponding entity. Similarly, if a slider area 510 is provided in a particular implementation, at least some of those sliders may be presented or visualized in a color or other manner sufficient to visually connect the corresponding value area 515 to a particular slider. The sliders may be presented in any suitable format or illustration, such as those different from the illustrated sliders shown in FIG. 5.

As illustrated, UI 505 may include an area 520 inside the pie chart in some instances. In some instances, this area 520 may present a total value associated with the data exchange being split. In others, the area 520 may provide a selectable control for accepting or confirming the current split between the associated entities. In some implementations, no area 520 may be provided, and the value areas 515 may extend through the center of the circle according to their splits. In some instances, area 520 may be used to more clearly differentiate the different value areas 515 for a quick and simple viewing of the present split.

Figure 6:
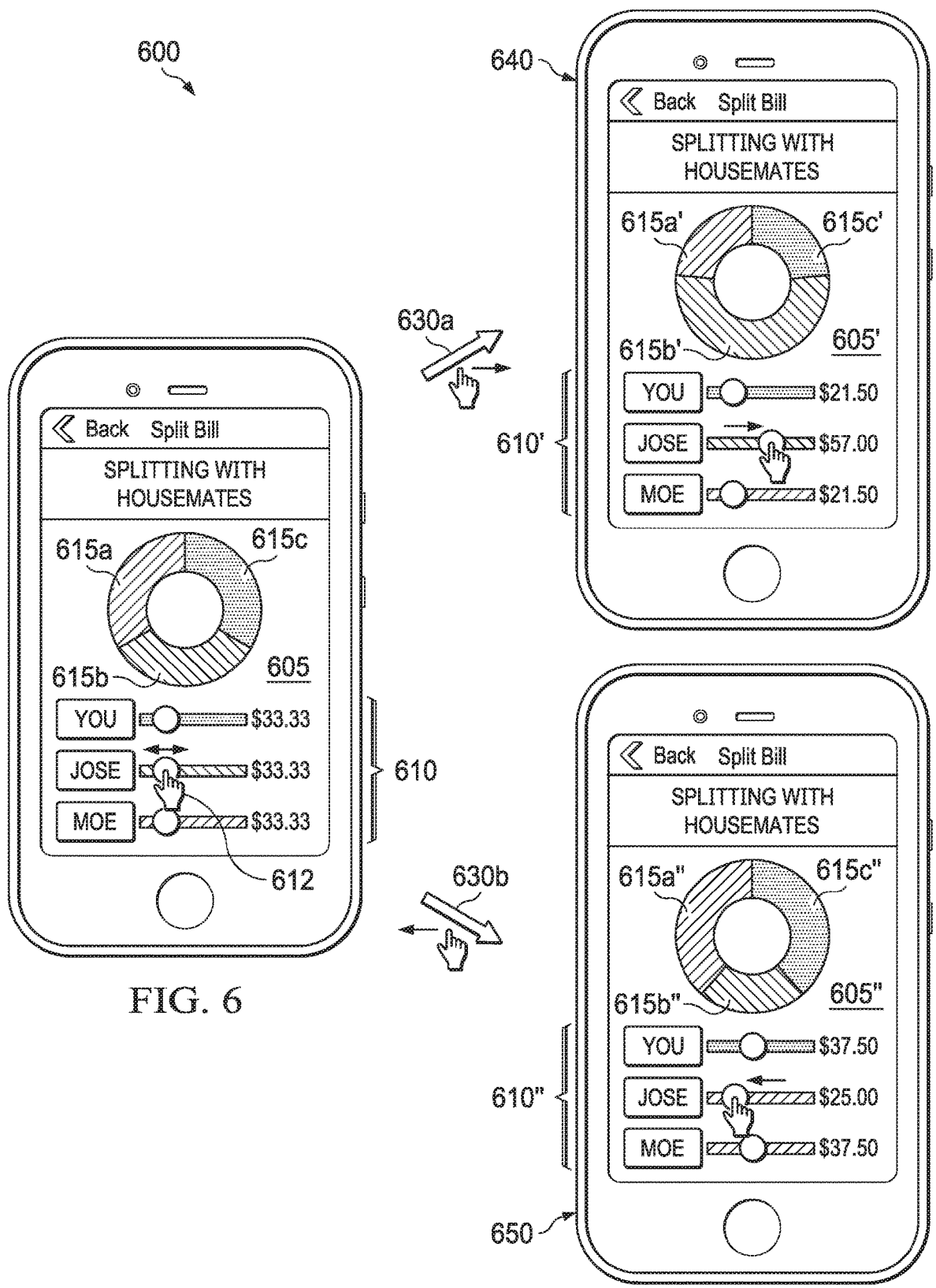
FIGS. 6-9 are illustrations of different example interactions with the data exchange split UI in certain example implementations of the present solutions.

FIG. 6 illustrates a first example interaction with the visualization, the first example interaction being associated with a slider portion 610 of the interface. The first interaction illustrates how the interactions with the slider portion 610 can affect and be reflected in the interactive visualization 605. As shown, a middle slider 612 associated with "Jose" is selected. In response to the selection of the control on the middle slider, two different movement interactions (630a and 630b) are provided. In response to a slide to the right as shown by 630a, Jose's relative portion of the total value is increased, while the portions associated with the other entities (i.e., "You" and "Moe") are decreased proportionally to Jose's increase as illustrated in updated illustration 640. As shown, the changes in the slider portion 610' are used to update the visualization 605'. Corresponding changes to value areas 615a' (a decrease in the value area), 615b' (an increase corresponding to Jose's change in the slider area 610'), and 615c' (a decrease) are reflected in the visualization. Alternative movement interactions and inputs can be used in different implementations or for different value areas.

Conversely, the movement interaction represented by 630b shows how a left input movement associated with a decrease to Jose's portion in updated illustration 650. As shown, the changes in the slider portion 610" are used to update the visualization 605", with corresponding changes to value areas 615a" (an increase in the value area), 615b" (a decrease corresponding to Jose's change in the slider area 610"), and 615c" (an increase in the corresponding visualization) are reflected in the visualization.

Figure 7:
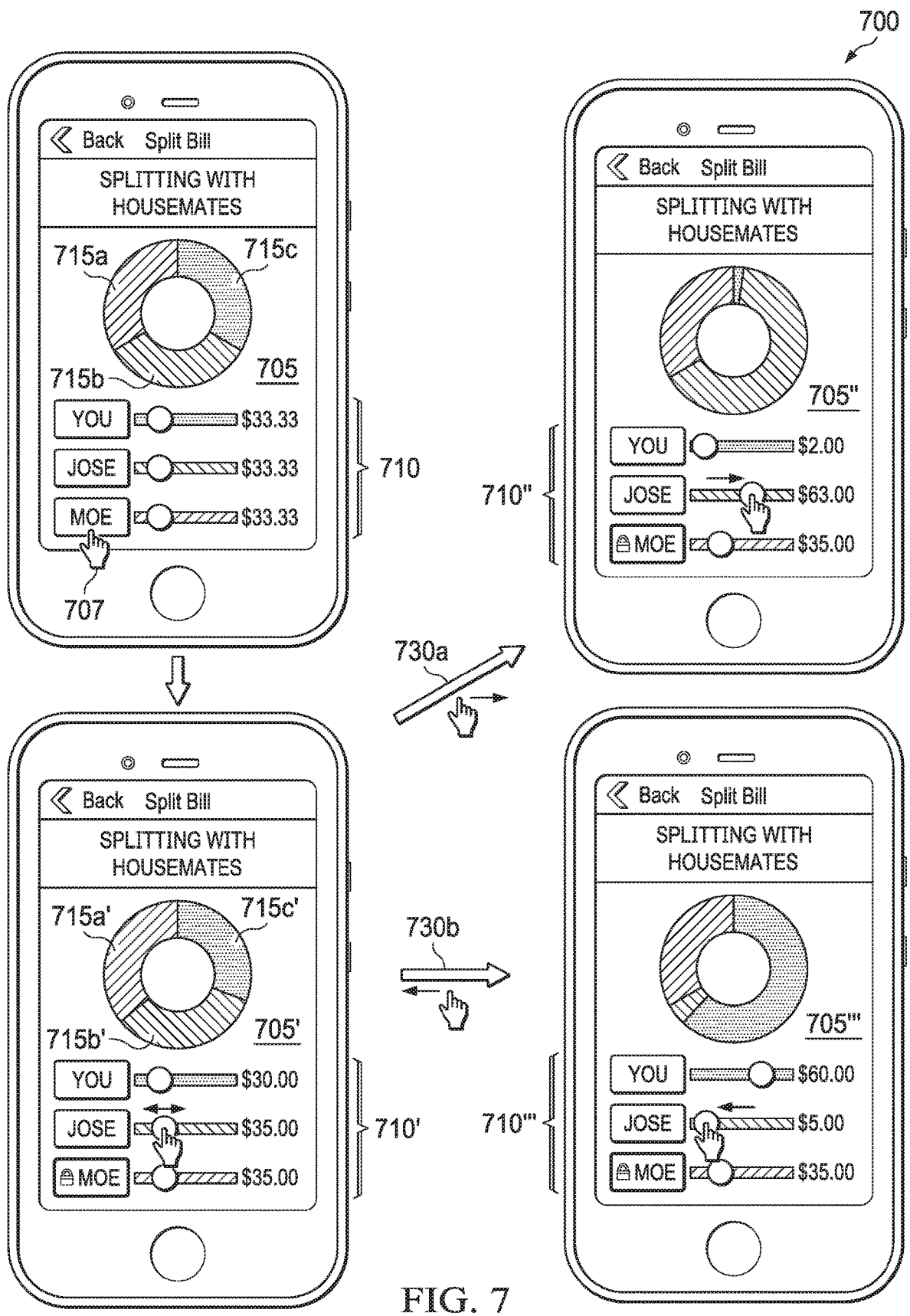

FIG. 7 illustrates a second example interaction with the visualization, this interaction also with the slider portion 710 of the interface. The second example interaction shows how the interactions after a locking request can affect the interactive visualization. In this example, a lock is placed on a particular entity in the slider portion of the initial UI 705. The lock may be placed through any suitable input. In FIG. 7, the lock is placed by selecting a particular entity in the slider portion 710 as shown by input interaction 707. As illustrated in 705', the entity "Moe" is then illustrated as locked. In the UI 705', an input selecting a slider for "Jose" is selected similar to the selection in FIG. 6. In this instance, however, the interactions of 730a (a right movement input) and 730b (a left movement input) only affect the non-locked value areas associated with "You" and "Jose". The size of the value area for "Moe" does not change in response to the received movement inputs. When Jose's portion is increased (by 730a), only the portion associated with "You" is correspondingly decreased. Similarly, when Jose's portion is decreased (by 730b), only the portion associated with "You"

is correspondingly increased. For both actions, neither the slider value nor the value area associated with "Moe" is modified in UI 705" or 705'''.

Figure 8:
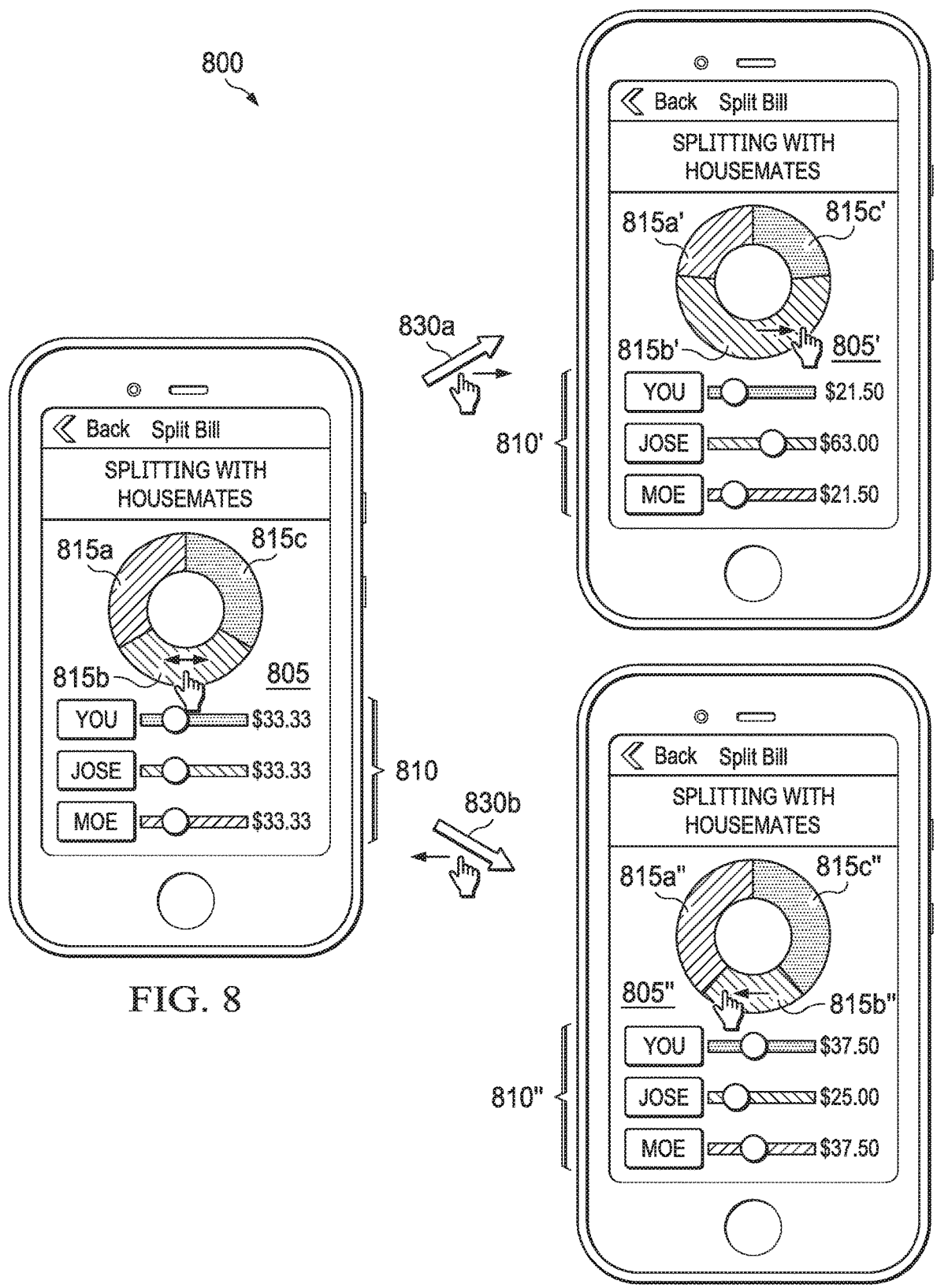

FIG. 8 illustrates a third example interaction with the UI 805. In this interaction, a user can directly select a particular value area 815 within the UI 805 and cause changes to be made without interactions to the slider area 810. As illustrated, a user can select value area 815*b* associated with "Jose". In response to the selection, two different movement inputs or interactions 830*a* and 830*b* are shown. In response to the right movement of 830*a*, the increase in the relative size of value area 815*b'* is shown, along with proportional decreases in the sizes of value areas 815*a'* and 815*c'*. Similarly, the movement input to the left of 830*b* indicates a decrease in the size of value area 815*b*, as illustrated by the size of value area 815*b"* in the updated UI 805". Proportional increases in the relative sizes of value areas 815*a"* and 815*c"* are then shown based on the interaction. In both 805' and 805", the slider areas 810' and 810", respectively, are illustrated as updated based on the received input.

Figure 9:
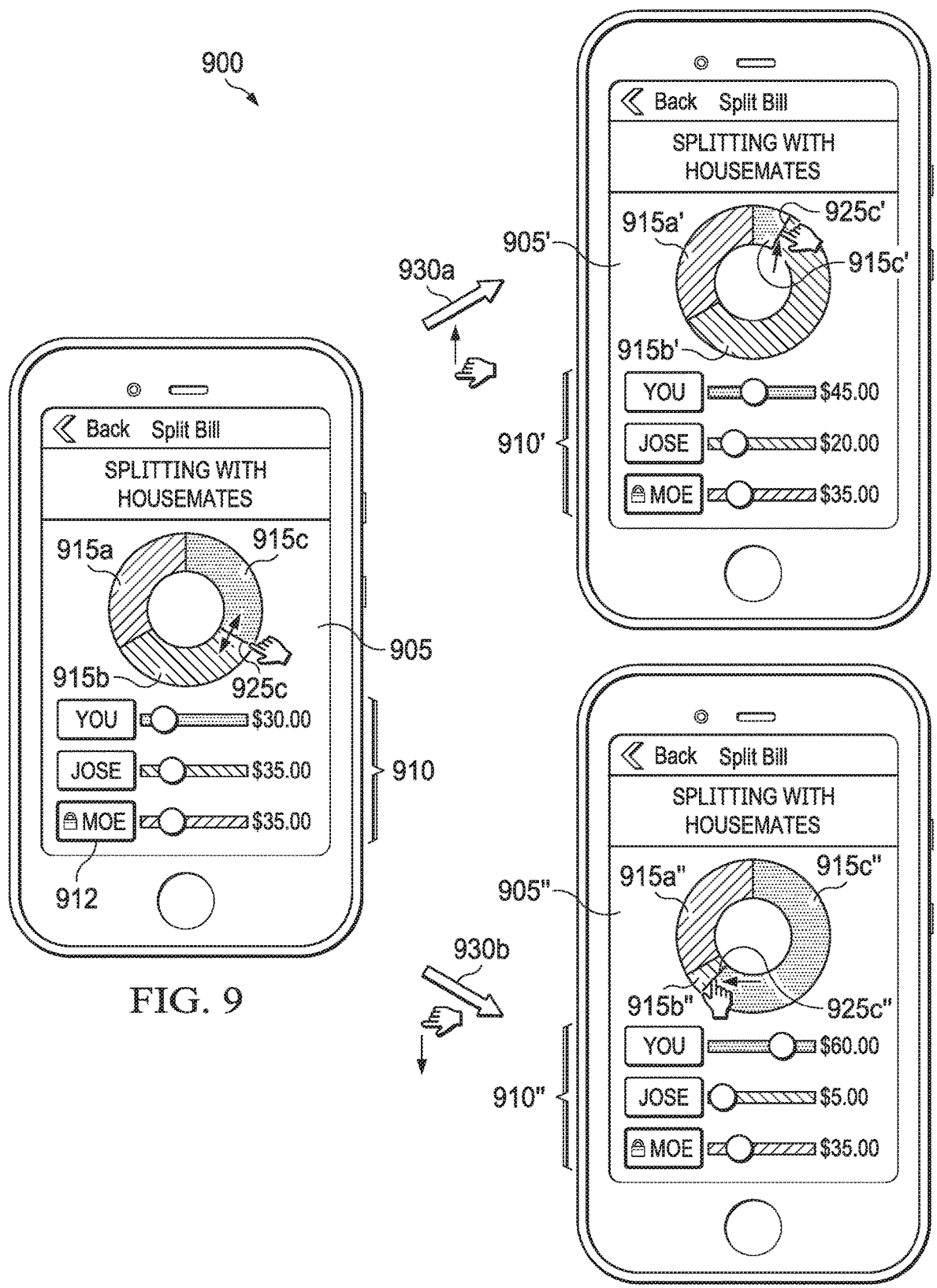

FIG. 9 illustrates a fourth example interaction with the UI 905. In this interaction, a user can select and interact with a particular edge 925 connecting and adjacent to two different value areas 915. In response to selecting a particular edge 925, any value areas not connected or adjacent to the edge 925 are automatically locked (similar to the locking illustrated in FIG. 7), and any modifications or movements to the particular edge 925 modify only the combined values of the two connected or adjacent value areas 915.

In the current example, edge 925*c* adjacent to value areas 915*b* and 915*c* is selected. As illustrated in the slider portion 910, the value area associated with "Moe" is automatically locked in response to the selection of the particular edge 925*c*. In response to particular movement inputs 930*a* or 930*b*, the edge 925*c* is adjusted to modify the split of the combined value areas 915*b* and 915*c*. In response to an upward movement input 930*a* modifying the placement of edge 925*c*, the amount or percentage associated with value area 915*b'* is increased while the amount or percentage associated with value area 915*c'* is decreased. However, the amount or percentage associated with value area 915*a'* is unchanged based on the automatic locking described above. Conversely, in response to a downward movement input 930*b* modifying the placement of edge 925*c*, the amount or percentage associated with value area 915*b"* is decreased while the amount or percentage associated with value area 915*c"* is increased. Again, the amount or percentage associated with value area 915*a"* is unchanged based on the lock.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A client device comprising:
   a user interface;
   a communications module;
   at least one input device;
   at least one memory storing instructions; and
   at least one hardware processor interoperably coupled with the at least one memory, the at least one input device, and the communications module, wherein the instructions instruct the at least one hardware processor to perform operations comprising:
   receiving a data exchange request comprising a data exchange associated with a total value of a service or a good,
   retrieving historical data exchange information and prior splits performed by at least three entities associated with the data exchange request,
   determining a suggested split of the data exchange based on processing, by using a machine learning technique, the data exchange, the historical data exchange information, and at least some of the prior splits performed by the at least three entities,
   presenting, via the user interface, an interactive visualization representing the suggested split of the data exchange, the interactive visualization comprising a chart comprising a total value of the data exchange presented in a ring divided into a plurality of contiguous value areas, wherein each value area is associated with a particular corresponding entity, wherein each particular value area is represented as a separate portion of the ring corresponding to a proportional amount of the total value of the data exchange and comprises two edges connecting the particular value area to two adjacent contiguous value areas, wherein an interior of each value area is associated with a first selectable control, and wherein each edge within the chart connecting pairs of value areas are each associated with a second selectable control,
   detecting, via the at least one input device, an input associated with a selection of a particular edge connecting a first and second value area,
   in response to the selection of the particular edge:
      locking each value area included in the chart not connected to the particular edge at a current value associated with each non-connected value area, wherein locking the non-connected value areas causes the portions associated with each value area to remain unchanged until unlocked, and
      locking a combined value area associated with the first and second value areas in the chart represented by the first and second value areas, where the combined value area represents a combination of a value associated with the first value area and a value associated with the second value area at time of the input associated with the selection of the particular edge, and wherein locking the combined value area comprises locking a total value of the first and second value areas at the time of the input associated with the selection of the particular edge, detecting, via the at least one input device, movement input associated with a movement of the particular edge, and in response to detecting the movement input, modifying a value associated with each of the first and second value areas in the chart without modifying the combined value area of the first and second value areas at the time of the input associated with the selection of the particular edge, wherein the particular edge between the first and second value areas is moved within the combined value area to illustrate the first value area and the second value area after the modification.

2. The client device of claim 1, wherein the client device comprises a mobile device.

3. The client device of claim 2, wherein the at least one input device comprises a touchscreen, where the input represents a touch-based input.

4. The client device of claim 3, wherein the detected movement input is detected while the input associated with the selection of the particular edge is maintained.

5. The client device of claim 1, wherein presenting the interactive visualization further comprises presenting an interactive slider presented adjacent to and separate from the interactive visualization of the chart, the interactive slider providing a plurality of sliders, each slider corresponding to one of the plurality of value areas.

6. The client device of claim 5, wherein, in response to modifying the value associated with each of the first and second value areas in the chart, sliders associated with the first and second value areas are updated to the modified values associated with first and second value areas.

7. The client device of claim 1, wherein modifying the value associated with each of the first and second value areas in the chart comprises maintaining prior values associated with each of the non-connected locked value areas.

8. The client device of claim 1, wherein, after modifying the value associated with each of the first and second value areas in response to the detected movement input, the combined value area of the modified values of the first and second value areas matches the combined value area of first value area and the second value area at the time of the input associated with the selection of the particular edge.

9. The client device of claim 1, wherein the operations comprise:

detecting an end of the input associated with the selection of the particular edge; and in response to detecting the end of the input associated with the selection of the particular edge, unlocking each value area not connected to the particular edge and unlock the combined value area associated with the first and second value areas.

10. The client device of claim 1, wherein the detected movement input comprises a dragging touch-based input.

11. The client device of claim 1, wherein the chart comprises a bar graph.

12. A non-transitory, computer-readable medium storing computer-readable instructions executable by a computer and configured to perform operations comprising:

receiving a data exchange request comprising a data exchange associated with a total value of a service or a good;

retrieving historical data exchange information and prior splits performed by at least three entities associated with the data exchange request;

determining a suggested split of the data exchange based on processing, by using a machine learning technique, the data exchange, the historical data exchange information, and at least some of the prior splits performed by the at least three entities;

presenting, via the user interface, an interactive visualization representing the suggested split of the data exchange, the interactive visualization comprising a chart comprising a total value of the data exchange presented in a ring divided into a plurality of contiguous value areas, wherein each value area is associated with a particular corresponding entity, wherein each particular value area is represented as a separate portion of the ring corresponding to a proportional amount of the total value of the data exchange and comprises two edges connecting the particular value area to two adjacent contiguous value areas, wherein an interior of each value area is associated with a first selectable control, and wherein each edge within the chart connecting pairs of value areas are each associated with a second selectable control;

detecting, via the at least one input device, input associated with a selection of a particular edge connecting a first and second value area;

in response to the selection of the particular edge:

locking each value area included in the chart not connected to the particular edge at a current value associated with each non-connected value area, wherein locking the non-connected value areas causes the portions associated with each value area to remain unchanged until unlocked; and locking a combined value area associated with the first and second value areas in the chart represented by the first and second value areas, where the combined value area represents a combination of a value associated with the first value area and a value associated with the second value area at time of the input associated with the selection of the particular edge, and wherein locking the combined value area comprises locking a total value of the first and second value areas at the time of the input associated with the selection of the particular edge;

detecting, via the at least one input device, movement input associated with a movement of the particular edge; and in response to detecting the movement input, modifying a value associated with each of the first and second value areas in the chart without modifying the combined value area of the first and second value areas at the time of the input associated with the selection of the particular edge, wherein the particular edge between the first and second value areas is moved within the combined value area to illustrate the first value area and the second value area after the modification.

13. The non-transitory, computer-readable medium of claim 12, wherein the at least one input device comprises a touchscreen, where the input represents a touch-based input.

14. The non-transitory, computer-readable medium of claim 13, wherein the detected movement input is detected while the input associated with the selection of the particular edge is maintained.

15. The non-transitory, computer-readable medium of claim 12, wherein presenting the interactive visualization further comprises presenting an interactive slider presented adjacent to and separate from the interactive visualization of the chart, the interactive slider providing a plurality of sliders, each slider corresponding to one of the plurality of value areas.

16. The non-transitory, computer-readable medium of claim 15, wherein, in response to modifying the value associated with each of the first and second value areas in the chart, sliders associated with the first and second value areas are updated to the modified values associated with first and second value areas.

17. The non-transitory, computer-readable medium of claim 12, wherein modifying the value associated with each of the first and second value areas in the chart comprises maintaining prior values associated with each of the non-connected locked value areas.

18. The non-transitory, computer-readable medium of claim 12, wherein, after modifying the value associated with each of the first and second value areas in response to the detected movement input, the combined value area of the modified values of the first and second value areas matches the combined value area of first value area and the second value area at the time of the input associated with the selection of the particular edge.

19. The non-transitory, computer-readable medium of claim 12, the operations comprise:
  detecting an end of the input associated with the selection of the particular edge; and
  in response to detecting the end of the input associated with the selection of the particular edge, unlocking each value area not connected to the particular edge and unlock the combined value area associated with the first and second value areas.

20. A computerized method performed by one or more processors, the method comprising:
  receiving a data exchange request comprising a data exchange associated with a total value of a service or a good;
  retrieving historical data exchange information and prior splits performed by at least three entities associated with the data exchange request;
  determining a suggested split of the data exchange based on processing, by using a machine learning technique, the data exchange, the historical data exchange information, and at least some of the prior splits performed by the at least three entities;
  presenting, via the user interface, an interactive visualization representing the suggested split of the data exchange, the interactive visualization comprising a chart comprising a total value of the data exchange presented in a ring divided into a plurality of contiguous value areas, wherein each value area is associated with a particular corresponding entity, wherein each particular value area is represented as a separate portion of the ring corresponding to a proportional amount of the total value of the data exchange and comprises two edges connecting the particular value area to two adjacent contiguous value areas, wherein an interior of each value area is associated with a first selectable control, and wherein each edge within the chart connecting pairs of value areas are each associated with a second selectable control;
  detecting, via at least one input device, input associated with a selection of a particular edge connecting a first and second value area;
  in response to the selection of the particular edge:
    locking each value area included in the chart not connected to the particular edge at a current value associated with each non-connected value area, wherein locking the non-connected value areas causes the portions associated with each value area to remain unchanged until unlocked; and
    locking a combined value area associated with the first and second value areas in the chart represented by portions representing the first and second value areas, where the combined value area represents a combination of a value associated with the first value area and a value associated with the second value area at time of the input associated with the selection of the particular edge, and wherein locking the combined value area comprises locking a total value of the first and second value areas at the time of the input associated with the selection of the particular edge;
  detecting, via the at least one input device, movement input associated with a movement of the particular edge; and
  in response to detecting the movement input, modifying a value associated with each of the first and second value areas in the chart without modifying the combined value area of the first and second value areas at the time of the input associated with the selection of the particular edge, wherein the particular edge between the first and second value areas is moved within the combined value area to illustrate the first value area and the second value area after the modification.

* * * * *